United States Patent
Oka

(10) Patent No.: US 9,685,884 B2
(45) Date of Patent: Jun. 20, 2017

(54) SEVEN-LEVEL INVERTER APPARATUS

(71) Applicant: TOSHIBA MITSUBISHI-ELECTRIC INDUSTRIAL SYSTEMS CORPORATION, Chuo-ku, Tokyo (JP)

(72) Inventor: Toshiaki Oka, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 14/895,626

(22) PCT Filed: Jul. 1, 2013

(86) PCT No.: PCT/JP2013/067974
§ 371 (c)(1),
(2) Date: Dec. 3, 2015

(87) PCT Pub. No.: WO2015/001597
PCT Pub. Date: Jan. 8, 2015

(65) Prior Publication Data
US 2016/0141977 A1    May 19, 2016

(51) Int. Cl.
*H02P 1/00* (2006.01)
*H02M 7/44* (2006.01)
(Continued)

(52) U.S. Cl.
CPC ............ *H02M 7/44* (2013.01); *H02M 7/487* (2013.01); *H02M 7/49* (2013.01); *H02P 27/08* (2013.01); *H02P 27/14* (2013.01); *H02M 7/5395* (2013.01)

(58) Field of Classification Search
CPC .......... H02M 7/537; H02M 2001/007; H02M 7/5395; H02M 7/483; H02M 7/515; H02P 27/08; H02P 27/14
See application file for complete search history.

(56) References Cited

U.S. PATENT DOCUMENTS 6,320,767 B1    11/2001   Shimoura et al.
2016/0118972 A1*  4/2016  Li ..................... H02M 7/5395
                                              327/175

FOREIGN PATENT DOCUMENTS

JP    2000-050643    2/2000

OTHER PUBLICATIONS

International Search Report for PCT/JP2013/067974 mailed on Aug. 20, 2013.

* cited by examiner

*Primary Examiner* — Karen Masih
(74) *Attorney, Agent, or Firm* — Amin, Turocy & Watson, LLP

(57) ABSTRACT

It is composed of a three-phase three-level inverter 1, three single-phase five-level inverters 2, each of which is connected in series with an output of each phase of the three-phase three-level inverter 1, and pulse width modulation control means 8 provided for each phase which supplies gate pulses to the three-level inverter 1 and the single-phase five-level inverter 2 of the relevant phase. State transition means 84 which determines an output of a switching leg of the three-level inverter 1, and outputs of outside and inside switching legs of the single-phase five-level inverter based on transition of a voltage level created by the pulse width modulation control means 8, makes all of the three outputs of the three-level inverter 1, and the outside and inside switching legs of the single-phase five-level inverter 2 0 or positive, when the voltage level is positive, makes all of the outputs of these three legs 0 or negative, when the voltage level is negative, and makes all of the outputs of these three legs 0, when the voltage level is 0.

5 Claims, 12 Drawing Sheets

(51) Int. Cl.
*H02M 7/487* (2007.01)
*H02M 7/49* (2007.01)
*H02P 27/08* (2006.01)
*H02P 27/14* (2006.01)
*H02M 7/5395* (2006.01)

|  | PHESE OUTPUT VOLTAGE | | |
| --- | --- | --- | --- |
|  | POSITIVE | 0 | NEGATIVE |
| 3-LEVEL LEG | +E/0 | 0 | 0/-E |
| 5-LEVEL OUTSIDE LEG | +E/0 | 0 | 0/-E |
| 5-LEVEL INSIDE LEG | +E/0 | 0 | 0/-E |

Fig.7

| A_sts<br>B_sts<br>C_sts | Au1<br>Bu1<br>Cu1 | Au2<br>Bu2<br>Cu2 | Au3<br>Bu3<br>Cu3 | Au4<br>Bu3<br>Cu3 |
|---|---|---|---|---|
| +E | ON | ON | OFF | OFF |
| +E ~0 (Dead time period) | OFF | ON | OFF | OFF |
| 0 | OFF | ON | ON | OFF |
| 0 ~-E (Dead time period) | OFF | OFF | ON | OFF |
| -E | OFF | OFF | ON | ON |

Fig.12

SEVEN-LEVEL INVERTER APPARATUS

TECHNICAL FIELD

This invention relates to a seven-level inverter apparatus which is composed by connecting a single-phase five-level inverter in series with each phase of a three-phase three-level inverter.

BACKGROUND ART

In recent years, a large capacity inverter apparatus expands its application, and is widely used mainly in an industrial field. In the case of a large capacity inverter apparatus, it is important to improve its overall efficiency, and accordingly, an output voltage is made high, and thereby the total loss including the loss of wiring such as a cable is reduced. In addition, as an inverter apparatus with a high voltage output like this, an apparatus is used in which a plurality of inverter apparatuses are multiplexed, and it is common to improve an output waveform using so-called pulse width modulation control.

As an example of this, a multiple inverter apparatus in which a single-phase inverter is connected in series with each phase of a three-phase inverter has been proposed (Refer to Patent Document 1, for example.).

PRIOR ART DOCUMENT

Patent Document

Patent Document 1: Japanese Patent Application Publication No. 2000-50643 (Pages 3-4, FIG. 1)

SUMMARY OF THE INVENTION

Problem to be Solved by the Invention

The method shown in Patent Document 1 relates to a configuration in which a single-phase inverter is connected in series with an output of each phase of a three-phase two-level inverter, but in order to make its capacity larger, it is considered to make this to be a configuration of a so-called seven-level inverter in which a single-phase five-level inverter is connected in series with an output of each phase of a three-phase three-level inverter. However, in the case of this seven-level inverter, when seen from a viewpoint as to what switching device is selected to perform pulse width modulation control for obtaining a desired voltage, since various options are available, not only the control thereof becomes complicated, but its operation may become unstable in some cases.

The present invention is made in view of the above-description, and makes it an object to provide a seven-level inverter apparatus with a relatively simple configuration which has stable control characteristic.

Means for Solving the Problem

In order to achieve the above-described object, a seven-level inverter apparatus of the present invention is a seven-level inverter apparatus comprising a three-phase three-level inverter which converts a DC voltage of a first DC power source of three levels into an AC voltage, three single-phase five-level inverters, each of which converts a DC voltage of a second power source of three levels having the same voltage as the first DC power source into an AC voltage, an output thereof being connected in series with an output of each phase of the three-phase three-level inverter, and pulse width modulation control means provided for each phase which performs pulse width modulation control of a give voltage reference to supply gate pulses to switching devices composing the relevant phase of the three-level inverter and the single-phase five-level inverter of the relevant phase, and is characterized in that the pulse width modulation control means has means which converts the voltage reference into a pulse width modulated voltage level of the relevant phase, and state transition means which determines an output of a switching leg of the relevant phase of the three-level inverter, and outputs of outside and inside switching legs of the single-phase five-level inverter, based on transition of this voltage level, and the state transition means makes all of the three outputs of the switching leg of the relevant phase of the three-level inverter, and the outside and inside switching legs of the single-phase five-level inverter 0 or positive, when the voltage level is positive, makes all of the three outputs of the switching leg of the relevant phase of the three-level inverter, and the outside and inside switching legs of the single-phase five-level inverter 0 or negative, when the voltage level is negative, and makes all of the three outputs of the switching leg of the relevant phase of the three-level inverter, and the outside and inside switching legs of the single-phase five-level inverter 0, when the voltage level is 0.

Effects of the Invention

According to the present invention, it is possible to provide a seven-level inverter apparatus with a relatively simple configuration which has stable control characteristic.

BRIEF DESCRIPTION OF THE DRAWINGS

FIG. 7 An explanation diagram relating to a state transition rule of the pulse width modulation control unit.

FIG. 12 An operation explanation diagram of the dead time conduction state determination unit.

EMBODIMENTS TO PRACTICE THE INVENTION

Hereinafter, embodiment of the present invention will be described with reference to the drawings.

Figure 1:
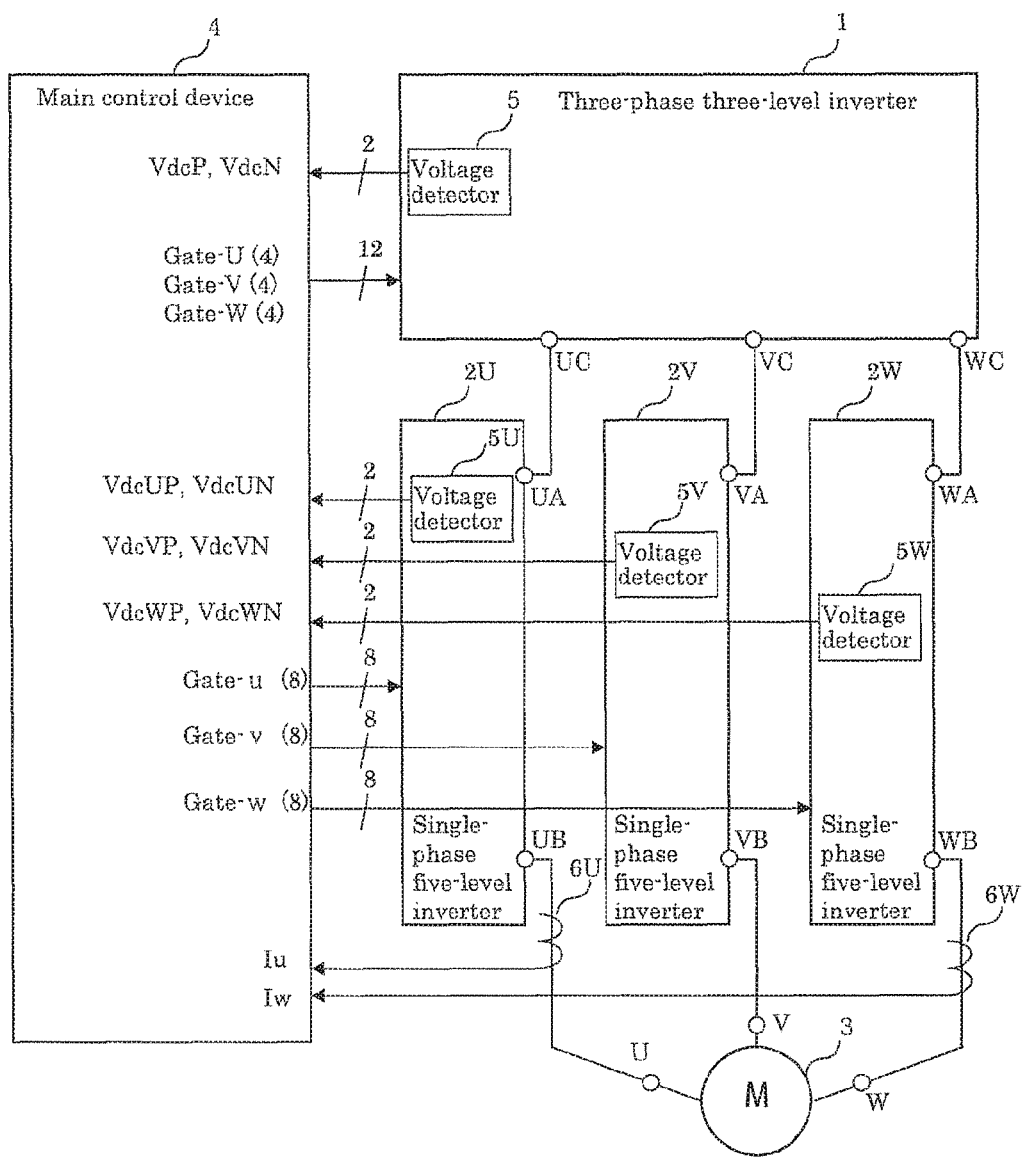
FIG. 1 A block diagram of a seven-level inverter apparatus according to an embodiment of the present invention.

FIG. 1 is a block diagram of a seven-level inverter apparatus according to an embodiment of the present invention.

In FIG. 1, a three-phase three-level inverter 1 outputs DC voltages of three levels, and three-phase outputs thereof are connected respectively so as to drive an AC motor 3 via single-phase five-level inverters 2U, 2V and 2W. That is, the respective phase-voltages of the three-phase three-level inverter 1 are boosted by output voltages of the single-phase five-level inverters 2U, 2V and 2W, and are connected to terminals of U-, V-, W-phases of the AC motor 3.

Gate signals of switching devices composing the three-phase three-level inverter 1 and the single-phase five-level inverters 2U, 2V and 2W are given from a main control device 4. A voltage detector 5 to detect DC voltage signals of three levels as feedback signals for control is provided in the three-phase three-level inverter 1, and gives the detection voltages thereof to the main control device 4. Similarly, voltage detectors 5U, 5V, 5W each to detect DC voltage signals of three levels are provided in the single-phase five-level inverters 2U, 2V, 2W, respectively, and give the detection voltages thereof to the main control device 4. In addition, input currents of the U-phase and the W-phase of the AC motor 3 are detected by current detectors 6U, 6W, respectively, and these detection currents Iu and Iw are also given to the main control device 4.

Figure 2:
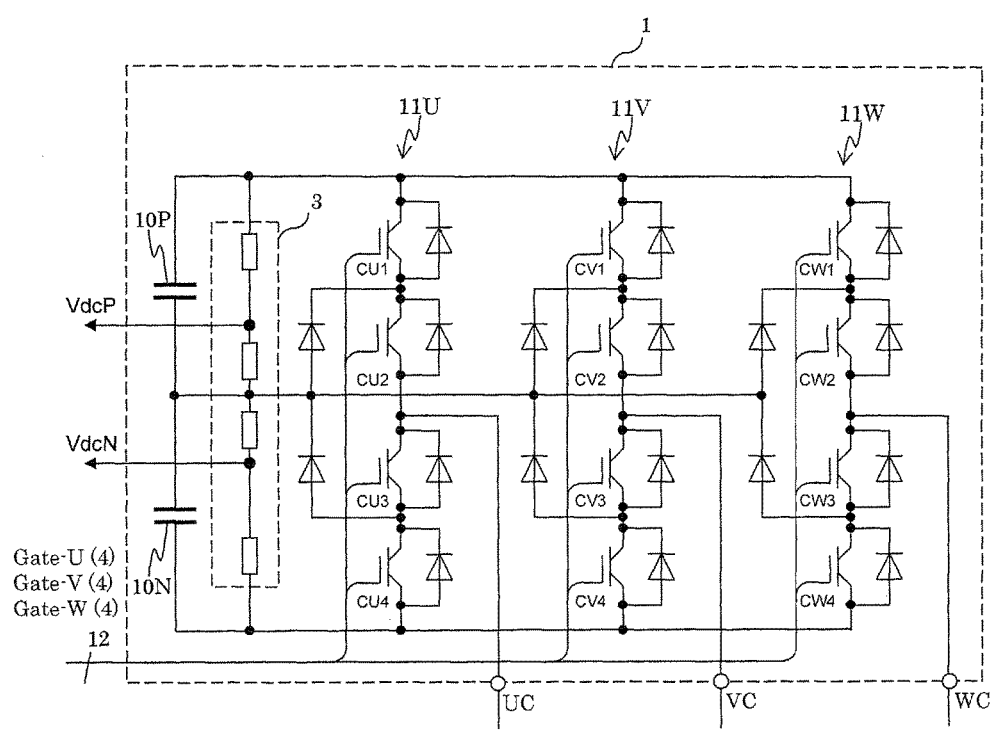
FIG. 2 An internal circuit diagram of the three-level inverter unit of the seven-level inverter apparatus according to the embodiment of the present invention.

FIG. 2 is an internal circuit diagram of the three-phase three-level inverter 1. Switching legs 11U, 11V and 11W are connected in parallel with a DC voltage source of three levels which is composed of a series circuit of a positive side DC power source 10P and a negative side DC power source 10N. The switching leg 11U is composed of series connected switching devices CU1, CU2, CU3 and CU4. Flywheel diodes are connected in antiparallel with the respective switching devices. A connection point of the switching devices CU1 and CU2, and a connection point of the switching devices CU3 and CU4 are clamped to a potential of a middle point by positive side and negative side clamp diodes, respectively. And a connection point of the switching devices CU2 and CU3 is an AC output terminal UC of the U-phase. Since the configurations of the switching legs 11V, 11W are basically the same as that of the switching leg 11U, the description of these will be omitted.

Out of the three-level voltages, a positive side DC voltage VdcP and a negative side DC voltage VdcN are detected by the voltage detector 5, which gives the detection voltages to the main control device 4. In addition, a gate signal Gate-U is given to the switching devices CU1, CU2, CU3 and CU4 from the main control device 4, a gate signal Gate-V is given to the switching devices CV1, CV2, CV3 and CV4 from the main control device 4, a gate signal Gate-W is given to the switching devices CW1, CW2, CW3 and CW4 from the main control device 4.

Figure 3:
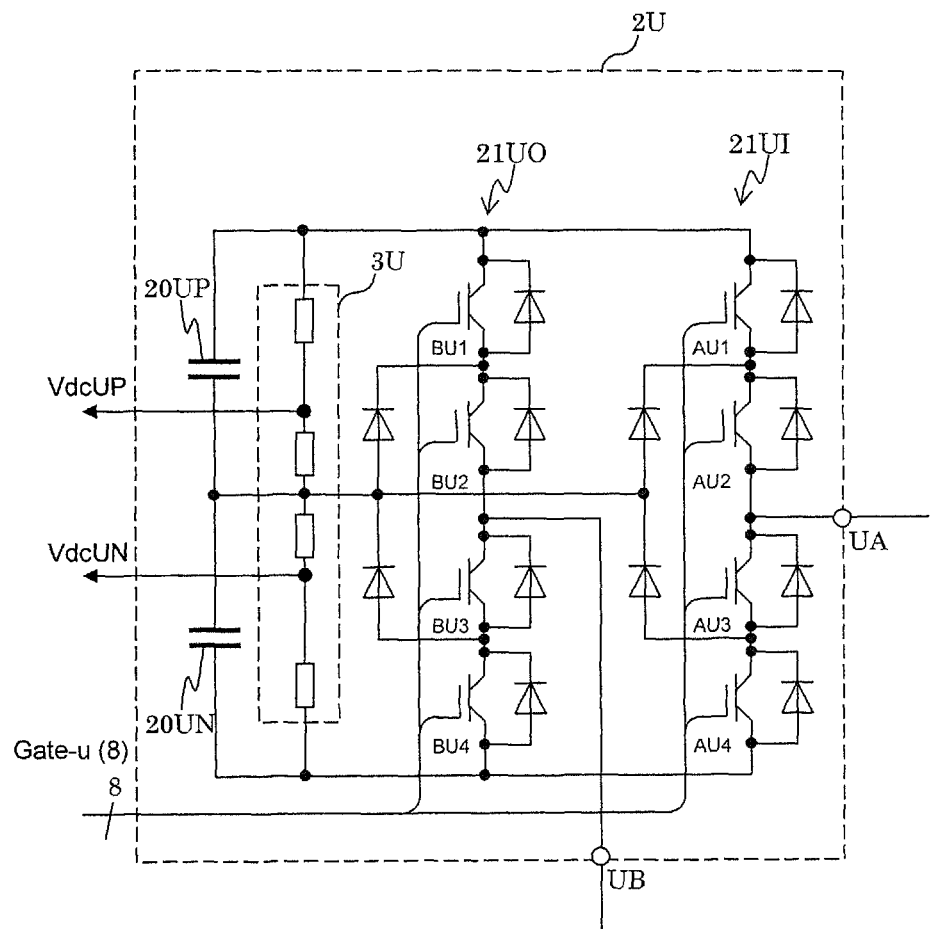
FIG. 3 An internal circuit diagram of the single-phase five-level inverter unit of the seven-level inverter apparatus according to the embodiment of the present invention.

FIG. 3 is an internal circuit diagram of the single-phase five-level inverter 2U. This single-phase five-level inverter 2U is a so-called boosting inverter which connects the output terminal UC of the U-phase of the above-described three-phase three-level inverter 1 and an output terminal UA, and boosts this output to obtain a phase output terminal UB. Since the single-phase five-level inverters 2V, 2W have basically the same internal configuration as that of the single-phase five-level inverter 2U, the illustration and description thereof will be omitted. Hereinafter the internal configuration of the single-phase five-level inverter 2U will be described.

Switching legs 21UO, 21UI are connected in parallel with a DC power source of three levels which is composed of a series circuit of a positive side DC power source 20UP and a negative side DC power source 20UN. The switching leg 21UO is composed of series connected switching devices BU1, BU2, BU3 and BU4. Flywheel diodes are connected in antiparallel with the respective switching devices. A connection point of the switching devices BU1 and BU2, and a connection point of the switching devices BU3 and BU4 are clamped to a potential of a neutral point by positive side and negative side clamp diodes, respectively. And a connection point of the switching devices BU2 and BU3 is the output terminal UB of the U-phase, which is connected to the U-phase terminal of the AC motor 3.

Similarly, the switching leg 21UI is composed of series connected switching devices AU1, AU2, AU3 and AU4. Flywheel diodes are connected in antiparallel with the respective switching devices. A connection point of the switching devices AU1 and AU2, and a connection point of the switching devices AU3 and AU4 are clamped to the potential of the neutral point by positive side and negative side clamp diodes, respectively. And a connection point of the switching devices AU2 and AU3 is the output terminal UA, which is connected to the output terminal UC of the U-phase of the three-level inverter 1.

Out of the three-level voltages of the single-phase five-level inverter 2U, a positive side DC voltage VdcUP and a negative side DC voltage VdcUN are detected by the voltage detector 5U, which gives the detection voltages to the main control device 4. A gate signal Gate-u is given from the main control device 4 to the switching devices BU1, BU2, BU3, BU4, and the switching devices AU1, AU2, AU3 and AU4.

Phase voltages of the inverter in which the three-phase outputs of the three-phase three-level inverter 1 are respectively boosted by the single-phase five-level inverters 2U, 2V, 2W as described above will be considered. Now when a case is supposed in which the positive side DC voltage VdcP and the positive side DC voltage VdcUP are the same +E, and the negative side DC voltage VdcN and the negative side DC voltage VdcUN are the same −E, values which the U-phase output voltage of the switching leg 11U of the three-phase three-level inverter 1 can obtain are three values of +E, 0, −E. And, values which the U-phase output voltages of the switching leg 21UI and the switching leg 21UO of the single-phase five-level inverter 2U can obtain are three values of +E, 0, −E, respectively. Accordingly, values which the U-phase output voltage of the boosted inverter can obtain are seven values of +3E, +2E, +E, 0, −E, −2E, −3E. Since the same is applied to the V-phase and the W-phase, it is found that the inverter in which the three-phase outputs of the three-phase three-level inverter 1 are respectively boosted by the single-phase five-level inverters 2U, 2V, 2W is a seven-level inverter. In addition, here values which the U-phase output voltages of the switching leg 21UI and the switching leg 21UO of the single-phase five-level inverter 2U can obtain are three values of +E, 0, −E, respectively, it is also found that values which the phase output voltage of the single-phase five-level inverter 2U can obtain are five values of +2E, +E, 0, −E, −2E. Hereinafter, the single-phase five-level inverter will be simply referred to as a five-level inverter.

Figure 4:
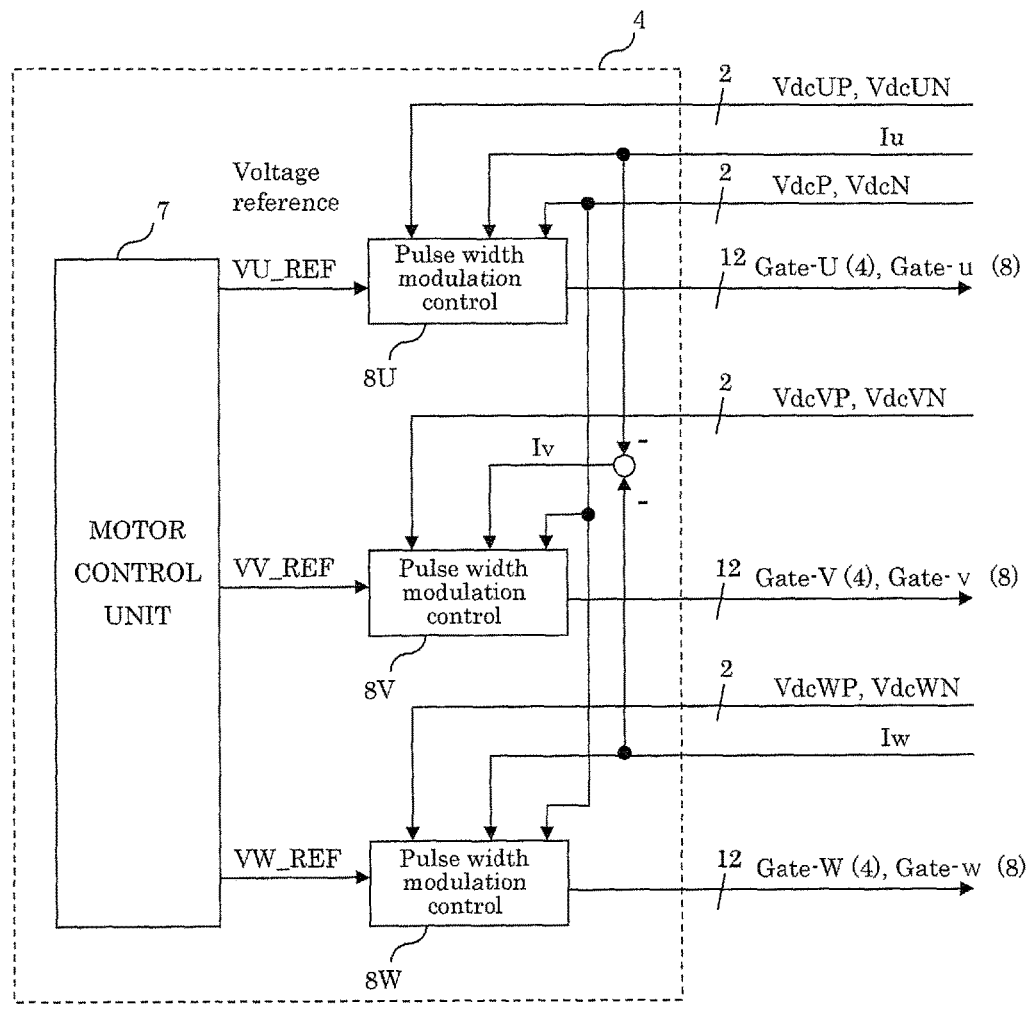
FIG. 4 An internal block diagram of the main control unit of the seven-level inverter apparatus according to the embodiment of the present invention.

Next, the control of the seven-level inverter, in particular, the pulse width modulation control thereof will be described with reference to FIG. 4 to FIG. 12. FIG. 4 is an internal block diagram of the main control device 4. Voltage references VU_REF, VV_REF, VW_REF of three phases which are obtained by a motor control unit 7 are respectively given to pulse width modulation control units 8U, 8V, 8W. When performing speed control of the AC motor 3, for example, the motor control unit 7 performs speed control so that a speed feedback signal of the AC motor 3 becomes a desired speed reference, and performs current control to output such a voltage reference that a current feedback signal coincides with a current reference that is the output thereof, but illustrations of these are omitted.

The pulse width modulation control unit 8U is given with the positive side DC voltage VdcP and the negative side DC voltage VdcN of the three-phase three-level inverter 1, the positive side DC voltage VdcUP and the negative side DC voltage VdcUN of the five-level inverter 2U, the U-phase current Iu, and outputs the gate signal Gate-U for the three-phase three-level inverter 1 and the gate signal Gate-u for the five-level inverter 2U. Similarly, the pulse width modulation control unit 8W is given with the positive side DC voltage VdcP and the negative side DC voltage VdcN of the three-phase three-level inverter 1, the positive side DC voltage VdcWP and the negative side DC voltage VdcWN of the five-level inverter 2W, the W-phase current Iw, and outputs the gate signal Gate-W for the three-phase three-level inverter 1 and the gate signal Gate-w for the five-level inverter 2W. In addition, the pulse width modulation control unit 8V is given with the positive side DC voltage VdcP and the negative side DC voltage VdcN of the three-phase three-level inverter 1, the positive side DC voltage VdcVP and the negative side DC voltage VdcVN of the five-level inverter 2V, a V-phase current Iv, and outputs the gate signal Gate-V for the three-phase three-level inverter 1 and the gate signal Gate-v for the five-level inverter 2V. Here, the V-phase current Iv is obtained by calculation from the relation Iv=−Iu−Iw.

The pulse width modulation control units 8U, 8V, 8W basically perform the same operation. Accordingly, hereinafter, the pulse width modulation control unit 8U of the U-phase will be described, and the description of the other phases will be omitted.

Figure 5:
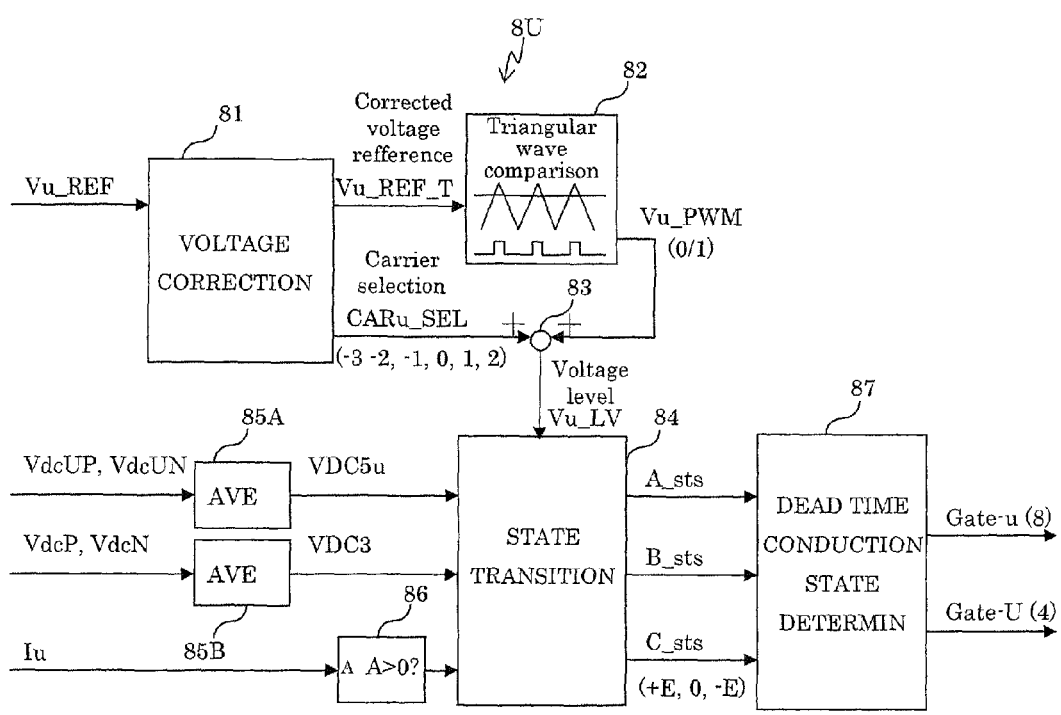
FIG. 5 An internal block diagram of the pulse width modulation control unit of the main control unit of the seven-level inverter apparatus according to the embodiment of the present invention.
Figure 6:
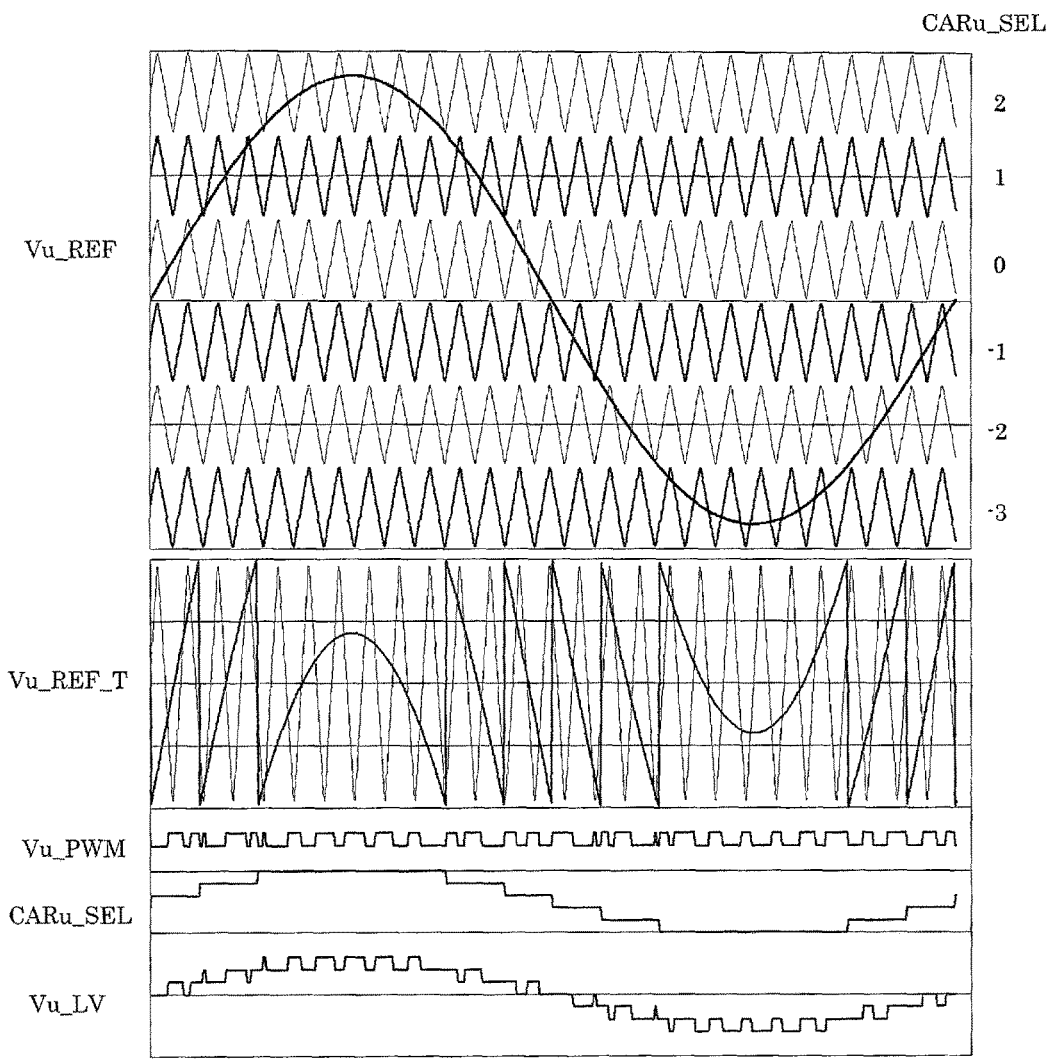
FIG. 6 An operation explanation diagram relating to PWM pulse generation of the pulse width modulation control unit.

FIG. 5 is an internal block diagram of the pulse width modulation control unit 8U. And FIG. 6 is an operation explanation diagram relating to PWM pulse generation of the pulse width modulation control unit 8U. The U-phase voltage reference VU_REF of a sine wave as shown in an upper stage of FIG. 6 is given to a voltage correction unit 81 of FIG. 5. In the normal pulse width modulation control of the seven-level inverter, a virtual triangular wave carrier is used which is obtained by aligning waveforms wherein DC offsets are respectively added to triangular wave carriers of the same phase by six stages, as shown in the upper stage of FIG. 6. It is possible to obtain a gate pulse for each switching device using the virtual triangular wave carrier like this, but the triangular wave carrier is to be assigned for each switching device, and thereby the control becomes complicated. For this reason, the U-phase voltage reference VU_REF is subjected to normalization correction within the range of ±1, as shown in the second and subsequent stages of FIG. 6, so that a gate pulse is obtained using one triangular wave carrier. A carrier selection CARu_SEL is added to a PWM pattern Vu_PWM which is obtained by a triangular wave comparator 82 in FIG. 5, using a voltage reference Vu_REF_T corrected in this manner, by an adder 83 in FIG. 5, and thereby a PWM voltage level Vu_LV as shown in the lowermost stage of FIG. 6 is obtained. Here, the carrier selection CARu_SEL is obtained in the voltage correction unit 81, and becomes integers of six stages from −3 to 2, as shown in the upper stage and the second stage from the bottom of FIG. 6, in accordance with the size of the U-phase voltage reference VU_REF. And the corrected voltage reference Vu_REF_T can be expressed by the following expression.

$$Vu\_REF\_T = 6 \cdot VU\_REF - 2 \cdot CARu\_SEL - 1 \quad (1)$$

The PWM voltage level Vu_LV is given to a state transition unit 84. This state transition unit 84 sequentially determines switching states of the respective switching devices of the switching leg 11U of the three-phase three-level inverter 1 and the five-level inverter 2U, so as to output the given PWM voltage level Vu_LV. As the condition for the state transition unit 84 to determine the switching states of the respective switching devices, VDC5u which is obtained by averaging the positive side DC voltage VdcUP and the negative side DC voltage VdcUN by an average value circuit 85A, VDC3 which is obtained by averaging the positive side DC voltage VdcP and the negative side DC voltage VdcN by an average value circuit 85B, and a signal which is obtained by performing negative/positive determination of the U-phase current Iu by a positive/negative determination circuit 86 are given to the state transition unit 84.

Hereinafter, an operation of the state transition unit 84 will be described. To begin with, the switching states which the switching leg 11U of the three-phase three-level inverter 1, and the outside switching leg 21UO and the inside switching leg 21UI of the five-level inverter 2U can take will be considered. The states capable of being taken are states of the cube of 3, that is 27, since each can take three states of E, 0, −E, as described above. Here, when the output voltages of the switching leg 11U of the three-phase three-level inverter 1 and the outside switching leg 21UO of the five-level inverter 2U are positive, the U-phase voltage of the seven-level inverter is added in positive, but when the output voltage of the inside switching leg 21UI of the five-level inverter 2U is positive, the U-phase voltage of the seven-level inverter seems to be subtracted. But, in the present application, the polarity of the output voltage is determined so that when the output voltage of the switching leg 21UI is positive, the U-phase voltage of the seven-level inverter is added in positive.

And a state transition rule is determined as shown in FIG. 7. That is, when an output voltage of a certain phase is positive, all outputs of the switching leg of the relevant phase of the three-level inverter, and the outside and inside switching legs of the five-level inverter of the relevant phase are made +E or 0, and a state to be −E is excluded. Similarly, when an output voltage of a certain phase is negative, all outputs of the switching leg of the relevant phase of the three-level inverter, and the outside and inside switching legs of the five-level inverter of the relevant phase are made 0 or −E, and a state to be +E is excluded. And, when an output voltage of a certain phase is 0, all outputs of the switching leg of the relevant phase of the three-level inverter, and the outside and inside switching legs of the five-level inverter of the relevant phase are made 0, and a state to be +E or −E is excluded. The state transition rule like this is determined, and thereby the fluctuation of the output voltages of the three switching legs can be suppressed, and the disturbance of control due to the unbalance of positive and negative voltages is decreased. In addition, the control logic can be simplified.

Figure 8:
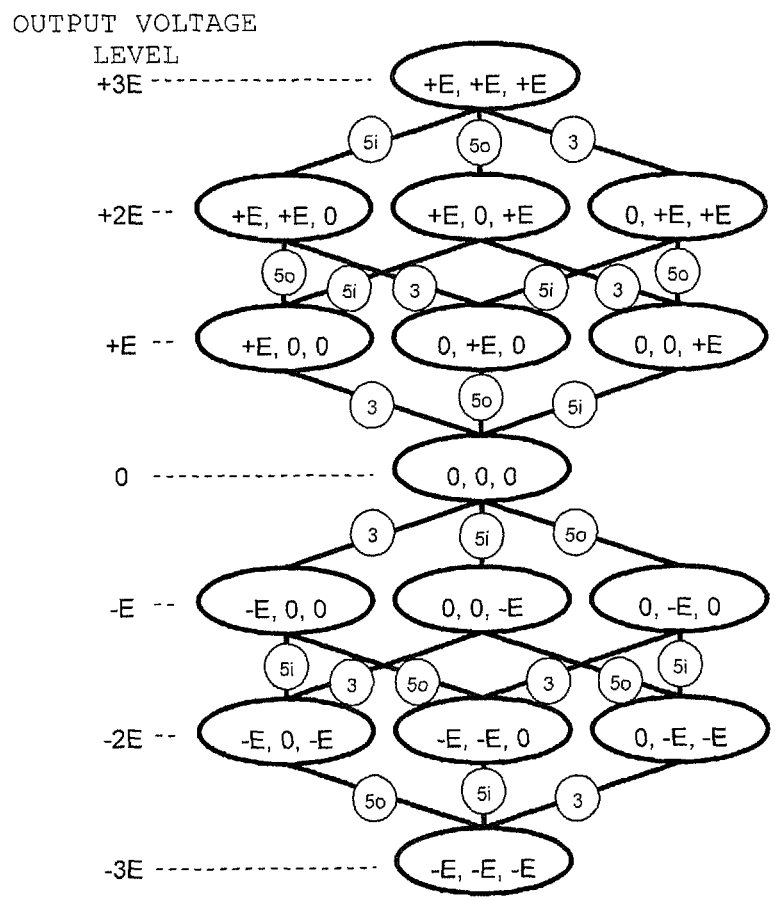
FIG. 8 An explanation diagram relating to the state transition of the pulse width modulation control unit.
Figure 8:
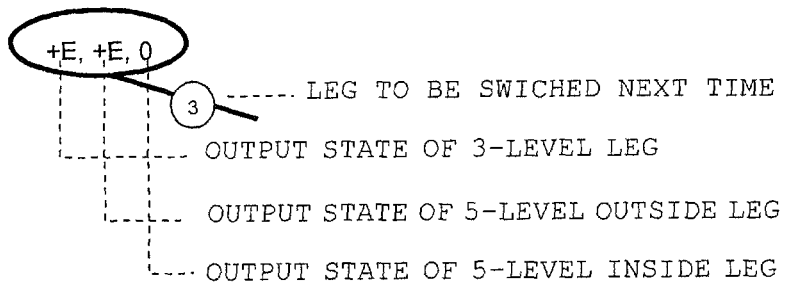
Figure 9:
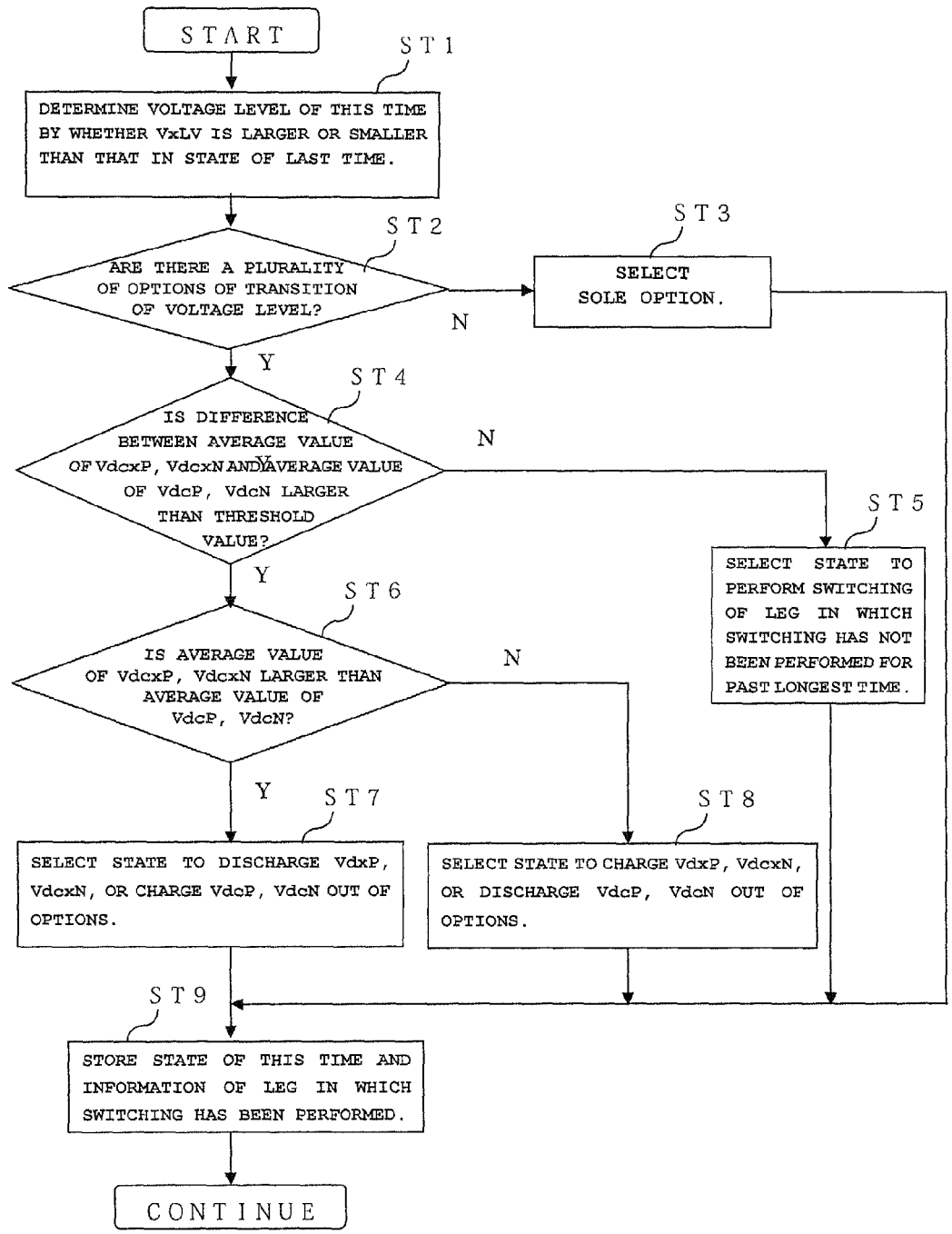
FIG. 9 A flow chart showing the state transition of the pulse width modulation control unit.

FIG. 8 is an explanation diagram relating to the state transition of the pulse width modulation control unit common to each phase. As output voltage levels of the phase voltage, there are seven levels from −3E to 3E, and combinations of the states capable of being taken corresponding to each level are illustrated, as shown in an explanatory note of the drawing. That is, an output of the switching leg of the three level inverter, an output of the outside switching leg of the five-level inverter, an output of the inside switching leg of the five-level inverter are described as (+E, +E, 0), corresponding to the indicated output voltage level +2E. When an output voltage level is −3E, 0, +3E, the option of the combinations of the states capable of being taken is only one. In contrast, the options when an output voltage level is −2E, −E, +E, +2E are respectively three. Since the above-described state transition rule is determined, six options when an output voltage level is 0, and respective three options when an output voltage level is −E, +E are excluded, and the options become above-described 15 options. In addition, in FIG. 8, what switching leg is switched, to thereby transit to the next voltage level is also shown. That is, 3 indicates the three-level inverter, 5o indicates the outside of the five-level inverter, and 5i indicates the inside of the five-level inverter.

In the state transition unit 84 of this embodiment, when the options are three, a combination of the states of the respective switching legs is to be selected, so that a difference voltage of the average value VDC5u of the DC voltages of the U-phase five-level inverter and the average value VDC3 of the DC voltages of the three-level inverter shown in FIG. 5, for example, becomes small. This selection method is shown in a flow chart of FIG. 9.

To begin with, a voltage level of this time is determined by whether VuLV is larger or smaller than that in the state of the last time (ST1). Next, whether there are a plurality of options as to what switching leg is to be switched, so as to transit from the voltage level of the last time to that of this time is checked (ST2). And when the option is only one, that option is selected (ST3), the state of this time and the information of the leg in which switching has been performed are stored (ST9), and the processing exits from the flow. When there are a plurality of options in the step ST2, whether or not a difference between the average value (Vdc5x) of VdcxP, VdcxN, and the average value (Vdc3) of VdcP, VdcN is larger than a threshold value is determined (step ST4). When the difference is smaller than the threshold value in the step ST2, out of the two to three options, an option to perform switching of the leg in which switching has not been performed for the past longest time is selected (ST5). And when the voltage difference is larger than the threshold value in the step ST4, whether or not the average value (Vdc5x) of VdcxP, VdcxN is larger than the average value (Vdc3) of VdcP, VdcN is checked (ST6). And when YES in the step ST6, a state to discharge VdxP, VdcxN, or charge VdcP, VdcN is selected (ST7). Conversely, when NO, a state to charge VdxP, VdcxN, or discharge VdcP, VdcN is selected (ST8).

In the above-description, in the steps ST7 and ST8, in order to control the balance of the DC voltages, there are an option to lower the voltage of the switching leg at the large voltage side, and an option to raise the voltage of the switching leg at the small voltage side. In this case, which is to be selected follows to the polarity of the phase current at that time point. This will be described in FIG. 10 and FIG. 11.

Figure 10:
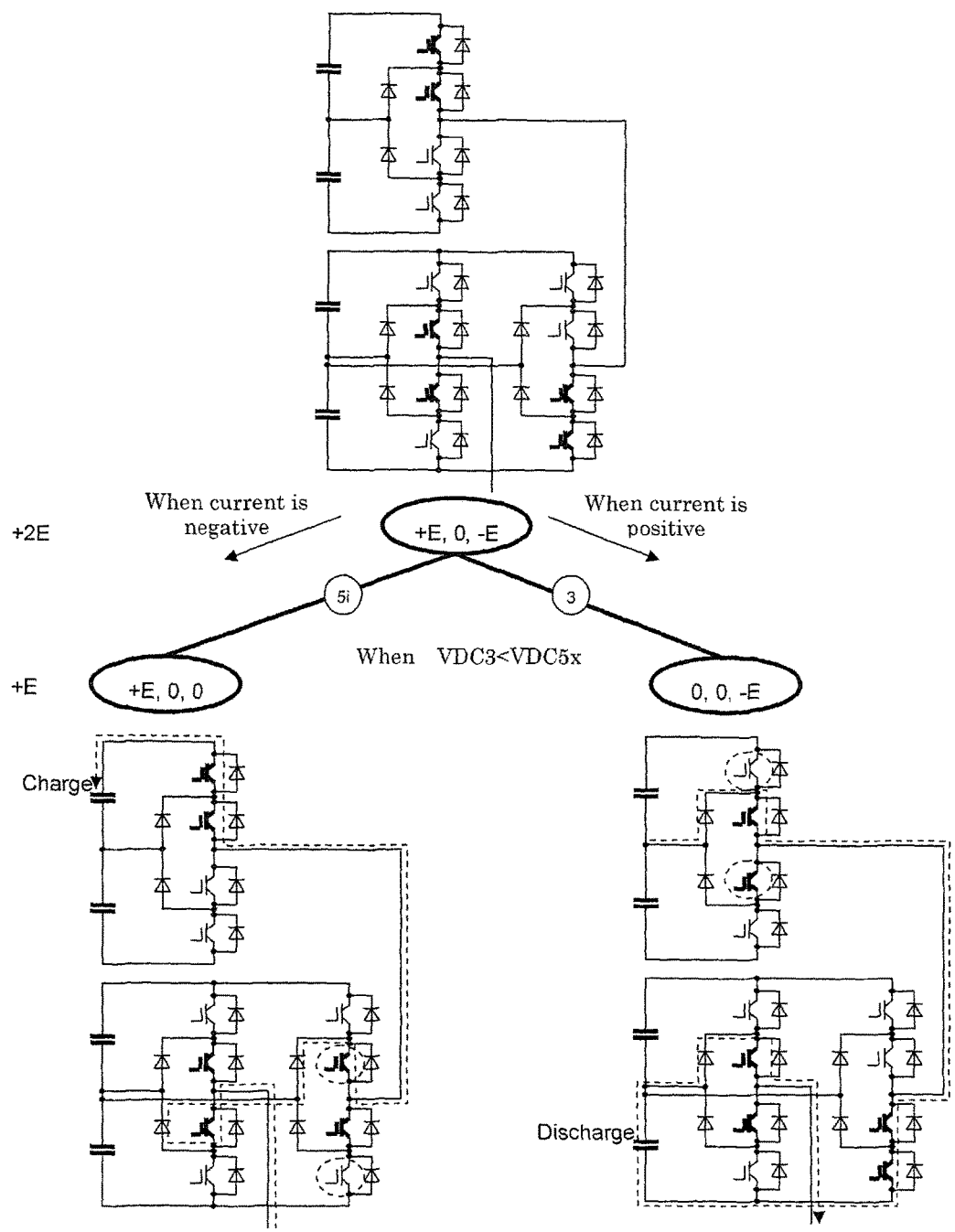
FIG. 10 An operation explanation diagram of the pulse width modulation control unit. (Explanation of the state transition in ST7 of FIG. 9)

FIG. 10 shows a case in which, when the output voltage level transits from +2E to +E, the voltage difference of the DC voltages is not less than the threshold value, and VDC3<Vdc5x, that is a transition example of the step ST7. As shown in the drawing, when the phase current is positive, in the route 3, that is, the output of the leg of the three-level inverter is transited from +E to 0, to discharge the DC charge at the five-level inverter side, and conversely when the phase current is negative, in the route 5i, that is, the output of the inside leg of the five-level inverter is transited from +E to 0, to charge the DC charge at the three-level inverter side.

Figure 11:
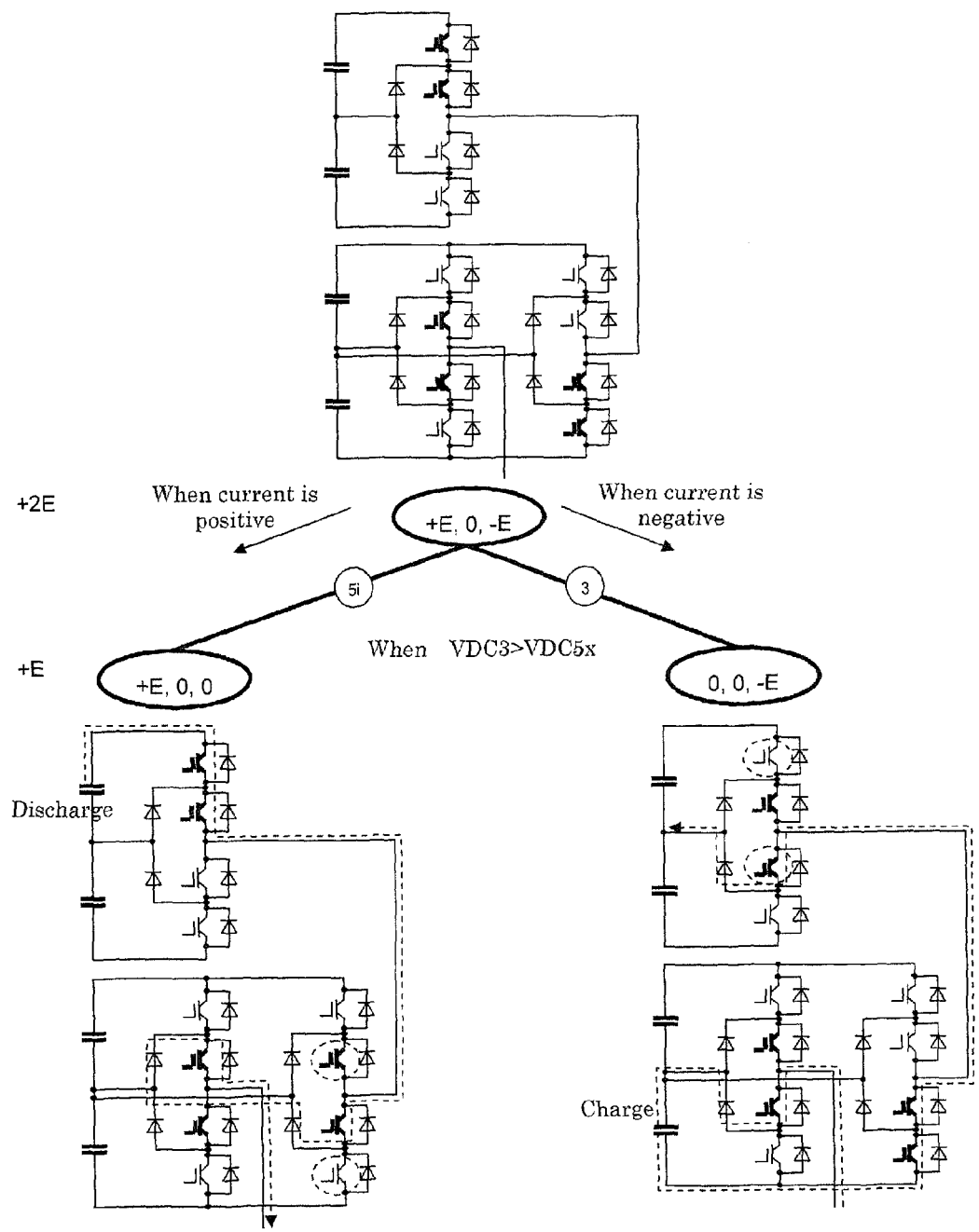
FIG. 11 An operation explanation diagram of the pulse width modulation control unit. (Explanation of the state transition in ST8 of FIG. 9)

FIG. 11 shows a case in which, when the output voltage level transits from +2E to +E, the voltage difference of the DC voltages is not less than the threshold value, and VDC3>Vdc5x, that is a transition example of the step ST8. As shown in the drawing, when the phase current is positive, in the route 5i, that is, the output of the inside leg of the five-level inverter is transited from +E to 0, to discharge the DC charge at the three-level inverter side, and conversely, when the phase current is negative, in the route 3, that is, the output of the leg of the three-level inverter is transited from +E to 0, to charge the DC charge at the five-level inverter side.

In this manner, the voltage balance control by discharge is selected when the current is positive, and the voltage balance control by charge is selected when the current is negative, and thereby a control in the direction of suppressing the fluctuation of potential becomes possible.

The state of this time is determined by the operation of the state transition unit 84 as described above, and respective state signals of A_sts of a positive side switching leg, B_sts of a negative side switching leg of the five-level inverter, and C_sts of the U-phase switching leg of the three-level inverter are obtained, and these signals are given to a dead time conduction state determination unit 87. In the dead time conduction state determination unit 87, as shown in FIG. 12, when an ON/OFF state of each of the switching devices changes, an period of OFF is provided as a dead time period. The gate signal Gate-u of the five-level inverter is obtained by A_sts and B_sts which are respectively given with the dead times, and the gate signal Gate-U of the three-level inverter is obtained from C_sts given with the dead time. The description has been made regarding the U-phase, but the V-phase, the W-phase are also completely the same as the U-phase.

While an embodiment of the present invention has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

For example, the load of the seven-level inverter is not limited to an AC motor. In addition, regarding the state transition unit 84, the transition rule so as to make the difference between the DC voltages of the three-level inverter and the five-level inverter small has been described, but without being limited to this, a transition rule may be determined so as to achieve equalization of the switching frequencies of the respective switching legs. In addition, each of the DC power sources of the three-level inverter and the five-level inverter is expressed by a symbol of a battery, but it may be a DC power source with a configuration to obtain a DC from an AC via a converter circuit.

DESCRIPTION OF THE SYMBOLS 1 three-phase three-level inverter
2U, 2V, 2W single-phase five-level inverter (five-level inverter)
3 AC motor
4 main control device
5, 5U, 5V, 5W voltage detector
6U, 6W current detector
7 motor control unit
8U, 8V, 8W pulse width modulation control unit
10P positive side DC power source
10N negative side DC power source
11U, 11V, 11W switching leg
20UP positive side DC power source
20UN negative side DC power source
21UO outside switching leg
21UI inside switching leg
81 voltage correction unit
82 triangular wave comparator
83 adder
84 state transition unit
85A, 85B average value circuit
86 positive/negative determination circuit

The invention claimed is:

1. In a seven-level inverter apparatus comprising:
a three-phase three-level inverter which converts a DC of a first DC power source of three levels into an AC;
three single-phase five-level inverters, each of which converts a DC of a second power source of three levels having the same voltage as the first DC power source into an AC, an output thereof being connected in series with an output of each phase of the three-phase three-level inverter; and
pulse width modulation control means provided for each phase which performs pulse width modulation control of a give voltage reference to supply gate pulses to switching devices composing the relevant phase of the three-level inverter and the single-phase five-level inverter of the relevant phase;
the seven-level inverter apparatus is characterized in that:
the pulse width modulation control means has
means which converts the voltage reference into a pulse width modulated voltage level of the relevant phase, and
state transition means which determines an output of a switching leg of the relevant phase of the three-level inverter, and outputs of outside and inside switching legs of the single-phase five-level inverter, based on transition of this voltage level; and
the state transition means makes all of the three outputs of the switching leg of the relevant phase of the three-level inverter, and the outside and inside switching legs of the single-phase five-level inverter 0 or positive, when the voltage level is positive,
makes all of the three outputs of the switching leg of the relevant phase of the three-level inverter, and the outside and inside switching legs of the single-phase five-level inverter 0 or negative, when the voltage level is negative, and
makes all of the three outputs of the switching leg of the relevant phase of the three-level inverter, and the outside and inside switching legs of the single-phase five-level inverter 0, when the voltage level is 0.

2. The seven-level inverter apparatus as recited in claim 1, characterized in that:
the state transition means,
when a voltage difference between the first DC power source and the second DC power source is not more than a prescribed threshold value, and there are a plurality of options of combination of the three outputs of the switching leg of the relevant phase of the three-level inverter, and the outside and inside switching legs of the single-phase five-level inverter;
selects a combination to perform switching of the switching leg in which switching has not been performed for the past longest time.

3. The seven-level inverter apparatus as recited in claim 1, characterized in that:
the state transition means,
when a voltage difference between the first DC power source and the second DC power source exceeds a prescribed threshold value, and there are a plurality of options of combination of the three outputs of the switching leg of the relevant phase of the three-level inverter, and the outside and inside switching legs of the single-phase five-level inverter;
selects a combination in which the voltage difference becomes small by switching.

4. The seven-level inverter apparatus as recited in claim 3, characterized in that:
the state transition means,
when there are a plurality of combinations in which the voltage difference becomes small by switching, selects a combination which discharges a charge of the DC power source with a larger voltage, when a current of the relevant phase is positive, and selects a combination which charges a charge to the DC power source with a smaller voltage, when the current of the relevant phase is negative.

5. The seven-level inverter apparatus as recited in claim 1, characterized in that a load is an AC motor.

* * * * *